April 16, 1968  D. E. LEE  3,378,029
NESTED RING VALVE
Filed Nov. 23, 1965
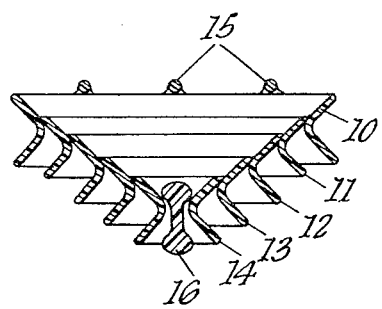

United States Patent Office 3,378,029
Patented Apr. 16, 1968

3,378,029
NESTED RING VALVE
Denis Ernest Lee, Acocks Green, Birmingham, England, assignor to Joseph Lucas (Industries) Limited, Birmingham, England, a British company
Filed Nov. 23, 1965, Ser. No. 509,327
2 Claims. (Cl. 137—512.1)

This invention relates to valves particularly though not exclusively of the kind intended for use in the human heart to replace a natural valve which has become defective.

The object of the invention is to provide a valve in a convenient form.

According to the present invention, a valve comprises a plurality of nested ring-like members, of descending sizes, each member having a generally V-shaped cross-section to define a concave external surface and a convex internal surface, so that when in the closed position, the outer edge of a smaller member is in sealing engagement with the convex internal surface of an adjacent larger member and the largest member, which is arranged to be secured in an orifice in a position of use, has means for preventing the other members moving beyond an open position which they occupy in response to the application of fluid pressure on one side of the valve, in which position the members all lie in substantially the same plane, the members being also capable of occupying a closed position in response to the application of fluid pressure on the other side of the valve, in which position they extend outwardly of one side of said plane in a generally conical formation.

The accompanying drawing, the single figure of which is a cross-sectional view, shows an example of an artificial heart valve constructed in accordance with this invention.

In this example the artificial heart valve comprises a plurality of similar ring-like members 10, 11, 12, 13, 14 each of generally V-shaped cross-section to define a concave external surface and a correspondingly convex internal surface. The members 10 to 14 are nested and are of descending sizes so that they can move axially relatively to one another but cannot be removed from the assembly.

The largest of the members 10 is arranged to be secured in an orifice in a position for use by any convenient means such as stitching. This member 10 carries on one axially presented edge, a plurality, for example, three rods 15 which extend across the opening formed by the member 10. In the smallest member 14 is disposed a plug 16 closing the space defined within this member 14.

The other members 11 to 14 can be moved into an open position, in response to the application of pressure on the side of the valve remote from the bars 15, in which position the members all lie in substantially the same plane and are separated from contact with one another to permit flow to take place through the valve. The members 10 to 14 are prevented from moving out of the plane beyond the bars 15 but can move in the opposite direction relatively to the largest member 10 to a closed position in response to the application of pressure in the opposite direction, in which the members collectively form a substantially conical structure. In this position, the outer edge of each smaller member is in sealing engagement with the convex internal surface of the adjacent larger member.

The plug 16 of the smallest of the members 14 may be separate or integral therewith or it may be omitted since it will be understood that in the latter case, in a heart valve the flow through this smallest member 14 is insignificant to the satisfactory performance of the valve.

The members of the valve are preferably formed from a synthetic resinous material or other material having the properties of being non-toxic, immune to attack by substances contained in the blood, and having a density which is approximately the same as that of blood. Furthermore it will be seen that there are substantially no regions over which flow does not take place, this being an important factor when the valve is used as an artificial heart valve since the risk of clotting is minimized.

Having thus described my invention what I claim as new and desire to secure by Letters Patent is:

1. A valve comprising a plurality of nested ring-like members, of descending sizes, each member having a generally V-shaped cross-section to define a concave external surface and a convex internal surface, so that when in the closed position, the outer edge of a smaller member is in sealing engagement with the convex internal surface of an adjacent larger member and the largest member, which is arranged to be secured in an orifice in a position of use, has means for preventing the other members moving beyond an open position which they occupy in response to the application of fluid pressure on one side of the valve, in which position the members all lie in substantially the same plane, the members being also capable of occupying a closed position in response to the application of fluid pressure on the other side of the valve, in which position they extend outwardly of one side of said plane in a generally conical formation.

2. A valve as claimed in claim 1 in which the smallest member has a plug which fills the space defined within said smallest member.

References Cited

UNITED STATES PATENTS

| 349,586 | 9/1886 | Glace | 137—512.3 X |

FOREIGN PATENTS

| 411,408 | 4/1910 | France. |
| 76,702 | 8/1894 | Germany. |
| 118 | 1868 | Great Britain. |
| 215,865 | 5/1924 | Great Britain. |

ALAN COHAN, *Primary Examiner.*

D. J. ZOBKIW, *Assistant Examiner.*